(12) United States Patent
Zhang et al.

(10) Patent No.: US 12,258,153 B2
(45) Date of Patent: Mar. 25, 2025

(54) DRONE DOCKING STATION

(71) Applicant: Aaron Zhang, Los Angeles, CA (US)

(72) Inventors: Aaron Zhang, Los Angeles, CA (US); Ruzhi Wang, Los Angeles, CA (US); Evan Hertafeld, Los Angeles, CA (US)

(73) Assignee: Aaron Zhang, Los Angeles, CA (US)

( * ) Notice: Subject to any disclaimer, the term of this patent is extended or adjusted under 35 U.S.C. 154(b) by 0 days.

(21) Appl. No.: 18/362,203

(22) Filed: Jul. 31, 2023

(65) Prior Publication Data
US 2024/0190594 A1 Jun. 13, 2024

(30) Foreign Application Priority Data

Dec. 12, 2022 (CN) .......................... 202211596847.1

(51) Int. Cl.
B64U 70/99 (2023.01)
B60L 53/80 (2019.01)
B64U 80/25 (2023.01)

(52) U.S. Cl.
CPC .............. *B64U 70/99* (2023.01); *B60L 53/80* (2019.02); *B64U 80/25* (2023.01); *B60L 2200/10* (2013.01)

(58) Field of Classification Search
CPC ........ B64U 70/99; B64U 70/97; B64U 80/25; B64U 50/37
See application file for complete search history.

(56) References Cited

U.S. PATENT DOCUMENTS

| 9,527,605 | B1 * | 12/2016 | Gentry | ................. G05D 1/0094 |
| 2016/0144734 | A1 * | 5/2016 | Wang | ................. B64C 29/0016 701/17 |
| 2022/0119110 | A1 * | 4/2022 | Augugliaro | ............ B64U 80/25 |

FOREIGN PATENT DOCUMENTS

KR 20180000810 A * 1/2018 .......... B60L 11/1822

* cited by examiner

*Primary Examiner* — Timothy D Collins
*Assistant Examiner* — Terri L Filosi
(74) *Attorney, Agent, or Firm* — Wang Law Firm, Inc.

(57) ABSTRACT

A drone docking station that includes an elevated platform fixed above the ground for drone docking is provided. The platform has a first locking element and a second locking element adapted on the drone to correspond to the first locking element to fulfill auto-alignment while the drone is approaching or docking the platform as well as auto-separation while the drone is leaving or about to leave the platform. A bearing and identification system is also included to identify location and bearing of the drone relative to the platform.

10 Claims, 7 Drawing Sheets

DRONE DOCKING STATION

BACKGROUND

Technical Field

The present invention relates to a drone docking station, and in particular to a drone docking station having a platform to allow the drone to stay in the air and not needing to land on the ground to proceed to conduct different kinds of tasks.

Related Art

Currently, delivery drones are non-invasive, safe and relatively friendly to customers. By means of the automatic winch, the drone is able to conduct package delivery while staying in the air. However, when the battery or payload of the drone needs to be replaced, the drone still needs to land on the ground. Nowadays, there are drone stations on the ground to receive drones, and operators are able to process the drones to undergo different tasks. Building such drone stations is expensive and complicated due to their sophisticated electro-mechanical systems and actuators. During the landing process, the drone's rotating propellers generate noise and pose a safety risk to nearby people. Conventional drone docking stations are complex, are prone to failure, and require frequent maintenance.

SUMMARY

The primary objective of the embodiment of the present invention is to provide a drone docking station having a platform fixed high above ground for drone docking. The platform has a first locking element, a second locking element adapted on the drone to correspond to the first locking element to fulfill auto-alignment while the drone is approaching or docking the platform as well as auto-separation while the drone is leaving or about to leave the platform; and a bearing and identification system to identify location and bearing of the drone relative to the platform.

In a secondary objective of the present invention, the drone docking station further has a charging system to charge the drone when the first locking element is connected to the second locking element.

In a further objective of the present invention, the charging system is a conductive charging system, the first locking element includes a first positive locking end and a first negative locking end respectively connected to a positive end and a negative end of the charging system, the second locking element includes a second positive end and a second negative end respectively adapted to be connected to a positive end and a negative end of a battery, when the first locking element is connected to the second locking element, the first positive locking end is connected to the second positive locking end and the first negative locking end is connected to the second negative locking end.

In a further objective of the present invention, the platform further includes a stop disk, and the first positive locking end and the first negative locking end are adjustable magnets fixed on the stop disk;
the second positive locking end and the second negative locking end are metal plates adapted on the drone for connection to the magnets.

In a further objective of the present invention, the platform further includes a stop disk and the first locking element is a plug or a socket located and fixed on the stop disk and the second locking element is a socket or a plug adapted on the drone to correspond to the plug or the socket on the stop disk to allow the plug or the socket on the stop disk to connect to the socket or the plug, the first positive locking end and the first negative locking end are the socket, or a metal plate of the first locking element, and the second positive locking end and the second negative locking end are the socket, or a metal plate of the second locking element.

In a further objective of the present invention, the platform further includes a stop disk and the second locking element is an extension rod adapted to be fixed on and extended out of the drone, the second positive locking end and the second negative locking end are second metal plates respectively attached to a top and an inner side of the extension rod, the first locking element includes an electrical clamp movably attached to the stop disk to clamp the top of the extension rod, the first positive locking end and the first negative locking end are first metal plates respectively attached to an inner side of the stop disk and the electrical clamp.

In a further objective of the present invention, the platform further includes a stop disk, the first positive locking end and the first negative locking end are metal hooks attached to the stop disk, and the second positive locking end and the second negative locking end are metal rings adapted to be attached to the drone to be connected to the metal hooks.

In a further objective of the present invention, the first positive locking end and the first negative locking end are two poles horizontally spaced apart from each other, the second positive locking end and the second negative locking end are two sets of arms on two opposite sides of the drone, and the distance between the two poles ranges between the distance between the two innermost points on the arms and the distance between the two outermost points on the arms.

In a further objective of the present invention, there are multiple platforms, at least two of which are each provided with a battery replacement housing having therein a battery replacement apparatus movable back and forth between the battery replacement housing and the platform for replacing batteries on board the drone.

In a further objective of the present invention, the batteries are respectively provided with metal plates on the front and adjustable magnets on the back to be adapted to attach to an inner side of the drone;
the first locking element includes at least two adjustable magnets and the second locking element includes at least two metal plates adapted to be mounted on the drone.

DETAILED DESCRIPTION OF THE PREFERRED EMBODIMENT

Along with the accompanying drawings, the preferred embodiment of the present invention is described.

In order to alleviate the noise and safety issues which come along with the drone landing process, the preferred embodiment of the present invention presents an elevated drone docking station. Detailed description of the preferred embodiment of the drone docking station will be illustrated with reference to the accompanying drawings.

Figure 1:
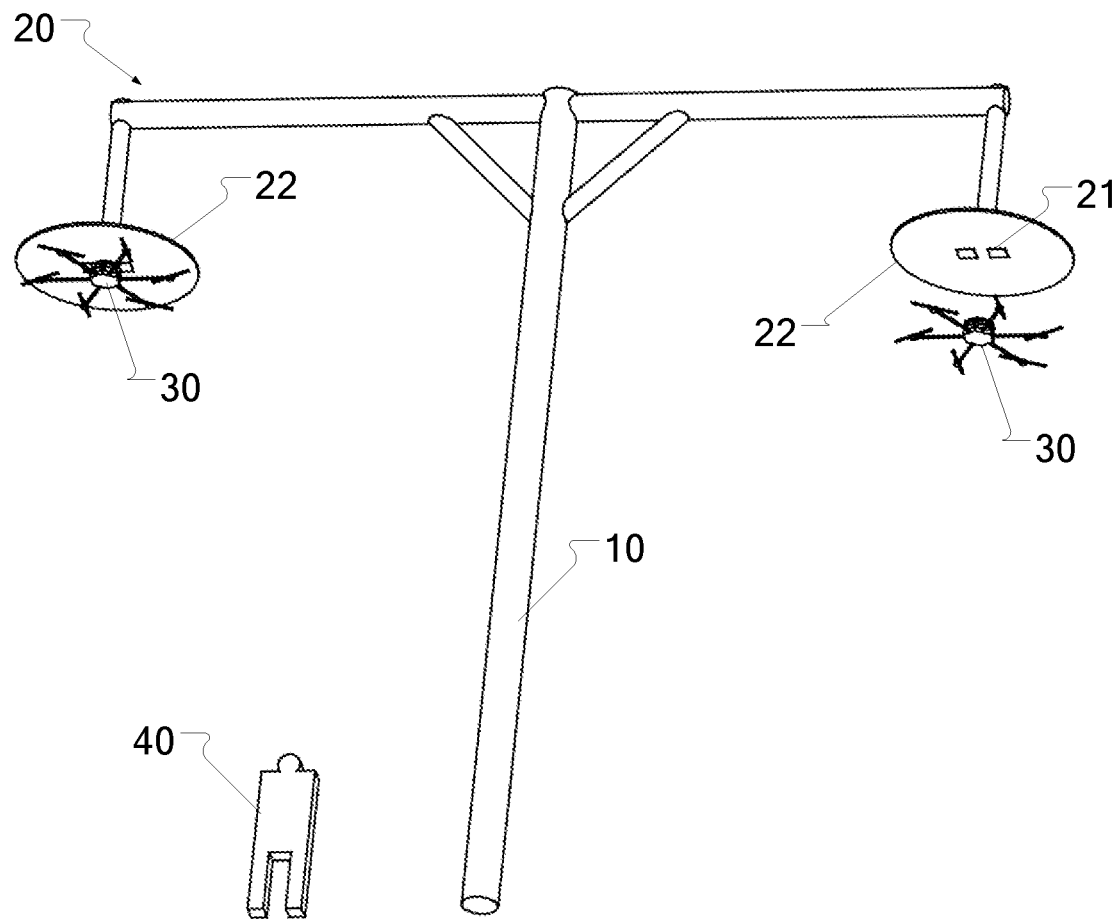
FIG. 1 is a schematic perspective view showing a first embodiment of the present invention.
Figure 2:
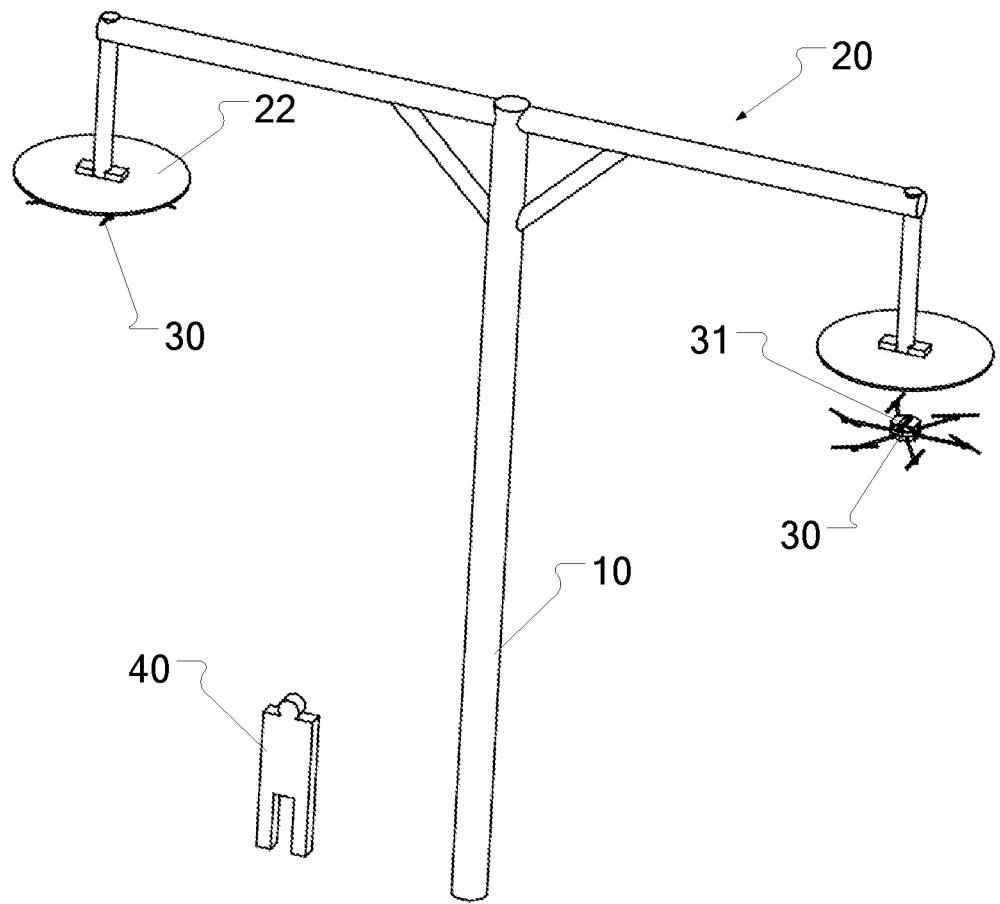
FIG. 2 is a schematic view showing another embodiment of the present invention.
Figure 4:
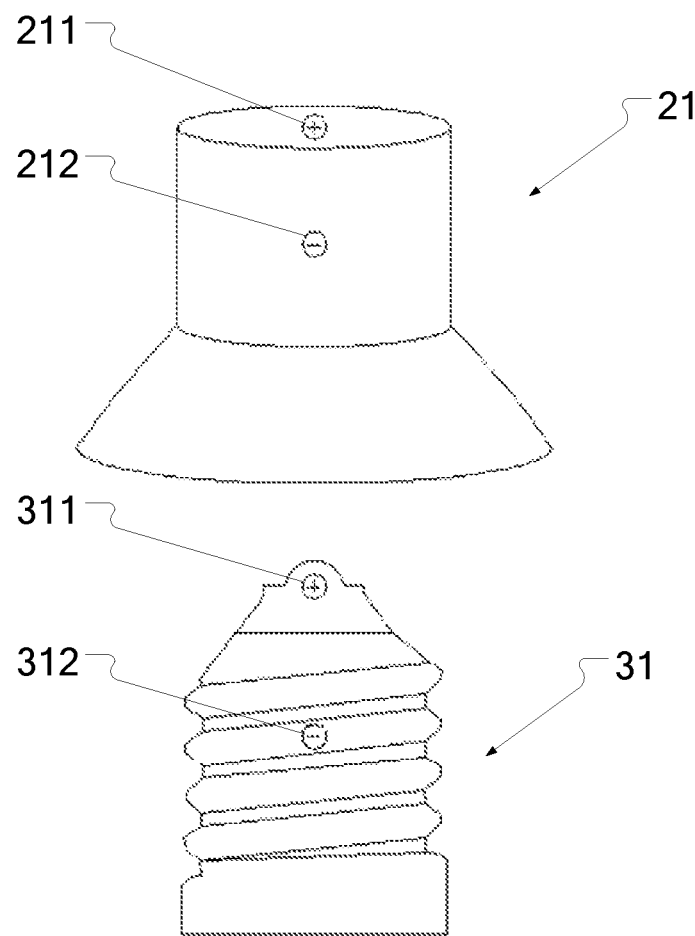
FIG. 4 is a perspective view showing a second embodiment of the first locking element and the second locking element of the present invention.

With reference to FIGS. 1, 2 and 4, the drone docking station constructed in accordance with the preferred embodiment of the present invention includes a platform 20 for a drone 30 and a bearing and identification system. The platform 20 includes a first locking element 21 and the drone 30 includes a second locking element 31 corresponding to the first locking element 21. The first locking element 21 and the second locking element 31, all together, satisfy the auto-alignment while the drone 30 is approaching the station or after the drone 30 is docked at the station. Likewise, the first locking element 21 and the second locking element 31, all together, satisfy the auto-separation while the drone 30 is in the process of leaving the station. The bearing and identification system is used to identify the drone 30 for its bearing and location and sends the related information back to the platform 20.

Specifically, the platform 20 is supported at a predetermined height by a pole-like object (post) 10 on the ground. The height is determined to alleviate concerns regarding noise, privacy and safety risk, to the surroundings caused by the drone and is convenient for the drone 30. The platform 20 is supported up in the air for no less than 15 meters (m) so that the station can be used as a communication tower with the drone 30. Moreover, weather monitoring equipment may be mounted on the post 10 to measure wind, rain, humidity and temperature nearby. The equipment is connected to the electricity grid for power and the data received may be directly linked to the drone server or is connected to the drone server via the help of the communication tower. With the help of the information from the weather monitor equipment, the flight plan of the drone can be adjusted any time when required. The pole-like object 10 can be above a house, a streetlamp pole, a tree trunk or any other structure manually arranged on the ground. The drone docking station can be seamlessly integrated into city infrastructure and pose no threat to the surrounding environment.

The bearing and location of an approaching drone can be identified via a fiducial marker and/or sensors, and the information is sent to the drone server. A remote control 40 for the drone 30 is used to maneuver the drone 30 to the designated spot if needed. An operation screen (not shown) for the operator can be mounted at the lower portion of the post 10 and is connected to the drone server so that the operator can maneuver the drone 30 directly from the operation screen if needed. The operation screen can not only provide an easy access to the drone 30, but also record the flight logs of the drone 30 and form a record for future reference and maintenance. For logistics drones, such as those of A2Z Drone Delivery's, the operator can also use the operation screen to operate the winch of the drone 30 to pick up and drop off packages in association with their facilities while the drone is still hovering in the air. The application of this technology, with multiple drone docking stations organized in a network, can complete different tasks. The drone docking stations are provided for drones to pick up/drop off packages and/or for inspection and patrol. This technology is non-invasive, safe and friendly to customers and redefines traditional methods of transport for goods, inspection, patrol and more.

The first locking element and the second locking element may adopt different interlocking mechanisms, such as magnetic locking. With reference to FIGS. 1 and 2, the platform 20 also includes a stop disk 22. The first locking element 21 is an adjustable magnet located at the bottom of the stop disk 22. The second locking element 31 is a metal plate located at the top of the drone 30 in association with the magnet. After the drone 30 is docked at the platform 20 (the metal plate is connected to the magnet), the magnetic force from the magnet is able to fulfill the auto-alignment process between the drone 30 and the platform 20. When the drone 30 is to depart from the platform 20, the magnetic force of the magnet is adjusted to zero such that the drone 30 is able to leave the platform 20 and afterwards, control of the drone 30 is possible.

With reference to FIG. 4, in a different embodiment of the present invention, it is to be noted that the platform 20 may also include a threaded socket 21, i.e., the first locking element 21 in addition to the stop disk 22, which is located at the bottom of the stop disk 22. The second locking element 31 is a threaded plug mounted at the top of the drone 30 to match with the first locking element 21. When the drone 30 is hovering in the air and approaching the stop disk 22, the drone 30 is controlled to rotate to allow the plug to gradually extend into the socket. When the drone 30 is to depart, the rotation of the drone 30 completes the separation of the plug from the socket. The socket-and-plug connection may also adopt other forms of plug-and-pull methods. For the socket-and-plug connection, the alignment requirement should be precise and accurate so that the control of the drone 30 should also be stable. As an embodiment of the present invention, it is best to have a flared guiding housing outside the socket to smooth the connection between the plug and the socket.

Figure 5:
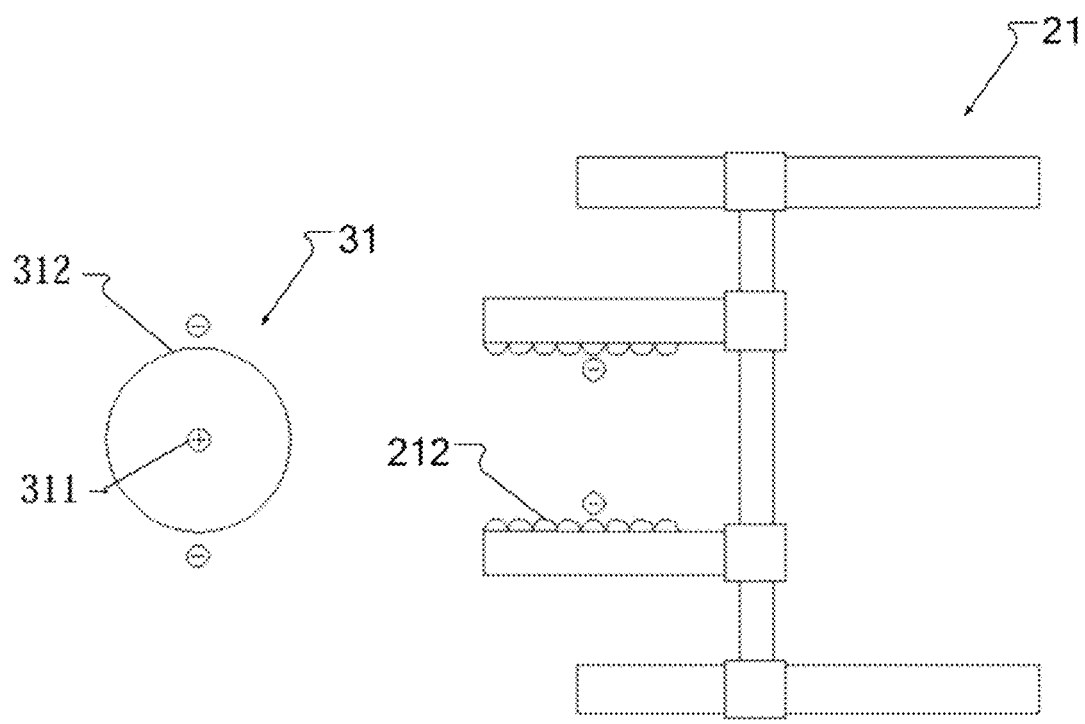
FIG. 5 is a plan view showing a third embodiment of the first locking element and the second locking element of the present invention.

In another embodiment of the present invention, as shown in FIG. 5, it is noted that the platform 20 has a stop disk 22 and the second locking element 31 is an extension rod mounted at the top of the drone 30. The first locking element 21 is an electrical clamp movably connected to the bottom of the stop disk 22 for clamping the extension rod of the drone 30. The electrical clamp is movable similar to structures like the X-Y axis in 3D printers or CNC routers to move in the X direction and Y direction. After the drone 30 stops at the stop disk 22 (after the extension rod is connected to the stop disk 22), the electrical clamp is moved towards the extension rod until the extension rod is securely clamped by the electrical clamp. When the drone 30 is departing from the stop disk 22, the electrical clamp is moved away from the extension rod and then the drone 30 is freely movable.

Figure 6:
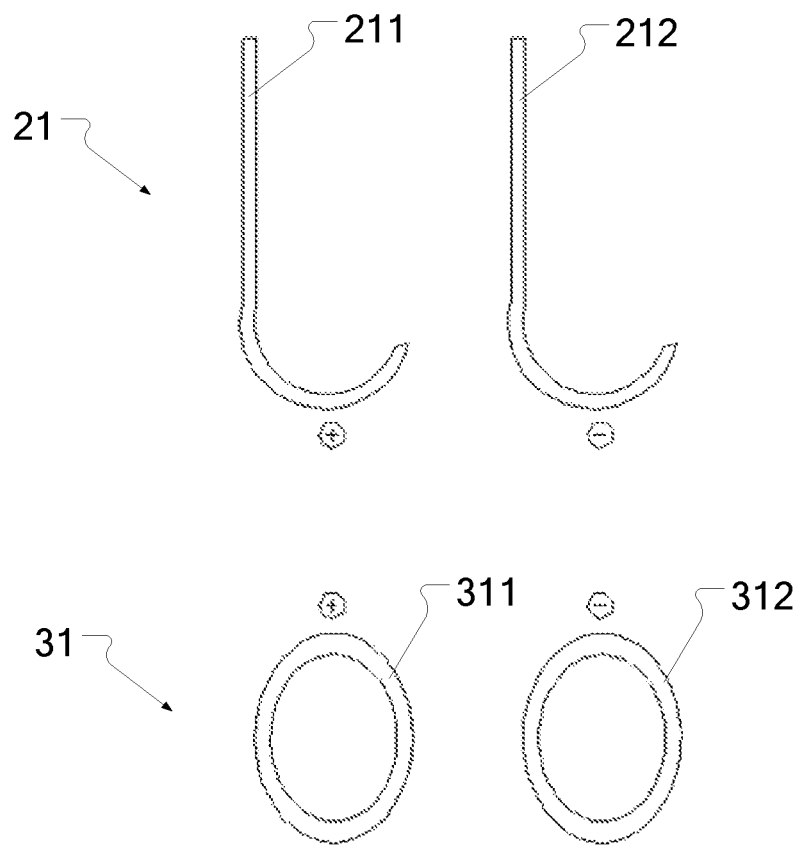
FIG. 6 is a plan view showing a fourth embodiment of the first locking element and the second locking element of the present invention.

With reference to FIG. 6, a further embodiment of the present invention is shown. The platform 20 includes a stop disk 22. The first locking element 21 is a hook securely attached to a bottom of the stop disk 22 and the second locking element 31 is a ring mounted at a top of the drone 30 to be connected with the hook. While the drone 30 is docking at the platform 20, the connection between the hook and the ring secures the drone 30 at the platform 20. When the drone 30 is to depart from the platform 20, a simple maneuver of the drone 30 will easily take the drone 30 off from the restrain of the hook.

Figure 7:
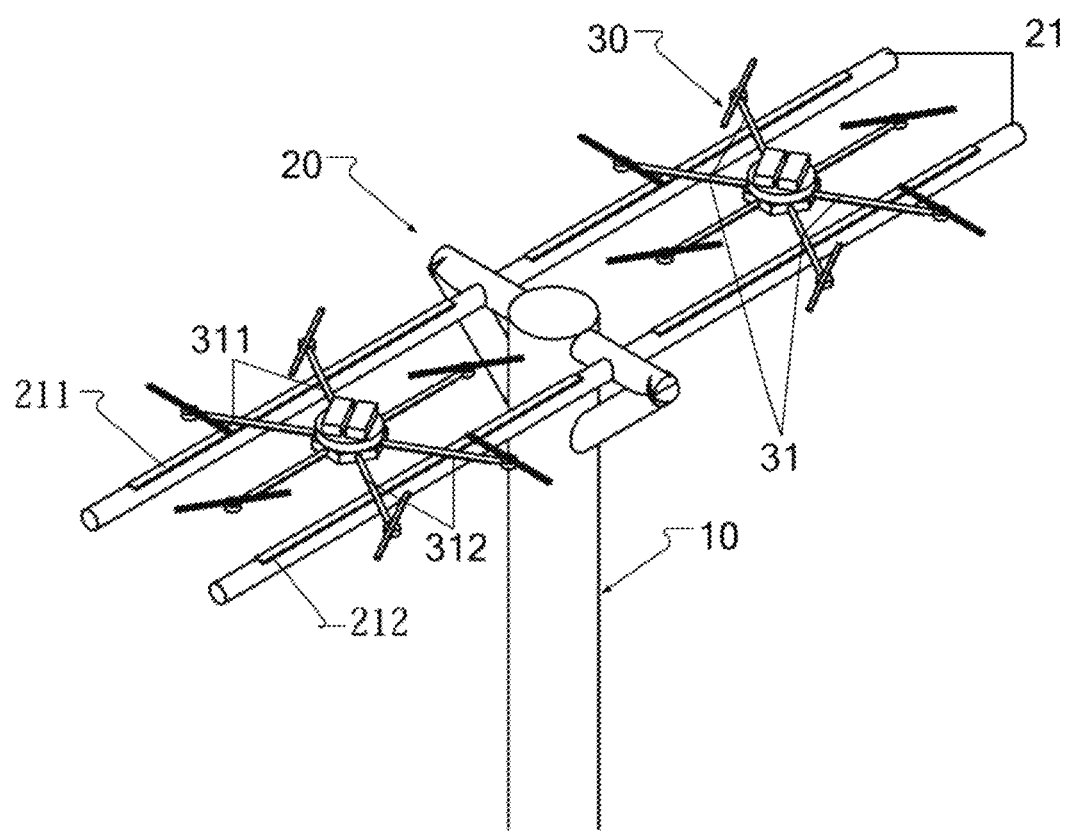
FIG. 7 is a schematic perspective view showing a fifth embodiment of the present invention cooperating with the drone docked on the platform.

All the above docking methods between the drone 30 and the platform 20 rely on suspending the drone 30 to secure the drone 30 to the bottom of the stop disk 22 such that the stop disk 22 is able to shelter the drone 30 from the sun and block the rain for the drone 30. With reference to FIG. 7, a different embodiment of the present invention is provided. The first locking element 21 includes two horizontally spaced poles respectively mounted on top of the pole-like object 10. The second locking element 31 includes two sets of arms respectively on two opposite sides of the drone 30. The distance between the two poles ranges between the distance between the two innermost points on the arms and the distance between the two outermost points on the arms. During the drone 30 docking process at the platform 20, the only thing required is to maneuver the drone 30 to the top of the two poles and land directly on top of the two poles. The two poles support the two sets of arms of the drone 30 and provide a stable alignment for the drone 30. Adopting this docking method to the drone 30 requires less positioning accuracy and is easier to maneuver. In addition to that, while the drone 30 is docked, the body weight of the drone lies between the two poles. The drone 30 is stationary, which fulfills the alignment to the drone 30 when the drone 30 is docked. Preferably, the center of each of the two poles is fixed to the object 10 so that each half of the poles is located at a respective one of two opposite sides of the object 10, thereby providing a stable support to the drone 30 for docking. If the length of the pole is long enough, each set of poles is able to support multiple drones 30 for docking.

While the drone 30 stops at the platform for resting and waiting for tasks for package pick-up or drop-off, the platform may also charge the drone 30. In order to ensure that the drone 30 no longer requires to be on the ground for charging, in this embodiment of the present invention, the platform includes a charging system. While the drone 30 rests at the platform 20 and the first locking element 21 and the second locking element 31 are securely connected, the charging system and the battery system of the drone 30 are connected for charging the battery of the drone 30.

Specifically, the charging system may adopt an inductive system or a conductive system. For an inductive system, it only requires that the emitting end of the charging system is provided close to the drone docking location (such as the stop disk 22 or on the two poles) and the receiving end of the charging system is mounted inside the drone 30 and connected to the battery so that when the drone 30 is docked at the platform 20, the receiving end is well within the sensing range of the emitting end of the charging system and the charging system is able to smoothly charge the battery of the drone 30.

When the conductive system is adopted and the drone 30 is docked at the platform 20, in order to establish the charging circuit, the first locking element should include a first positive locking end connected to the positive end of the charging system and a first negative locking end connected to the negative end of the charging system while the second locking element may include a second positive locking end and a second negative locking end respectively connected to the positive end and the negative end of the charging system. When the first locking element and the second locking element are connected, the first positive locking end is connected to the second positive locking end and the first negative locking end is connected to the second negative locking end.

Figure 3:
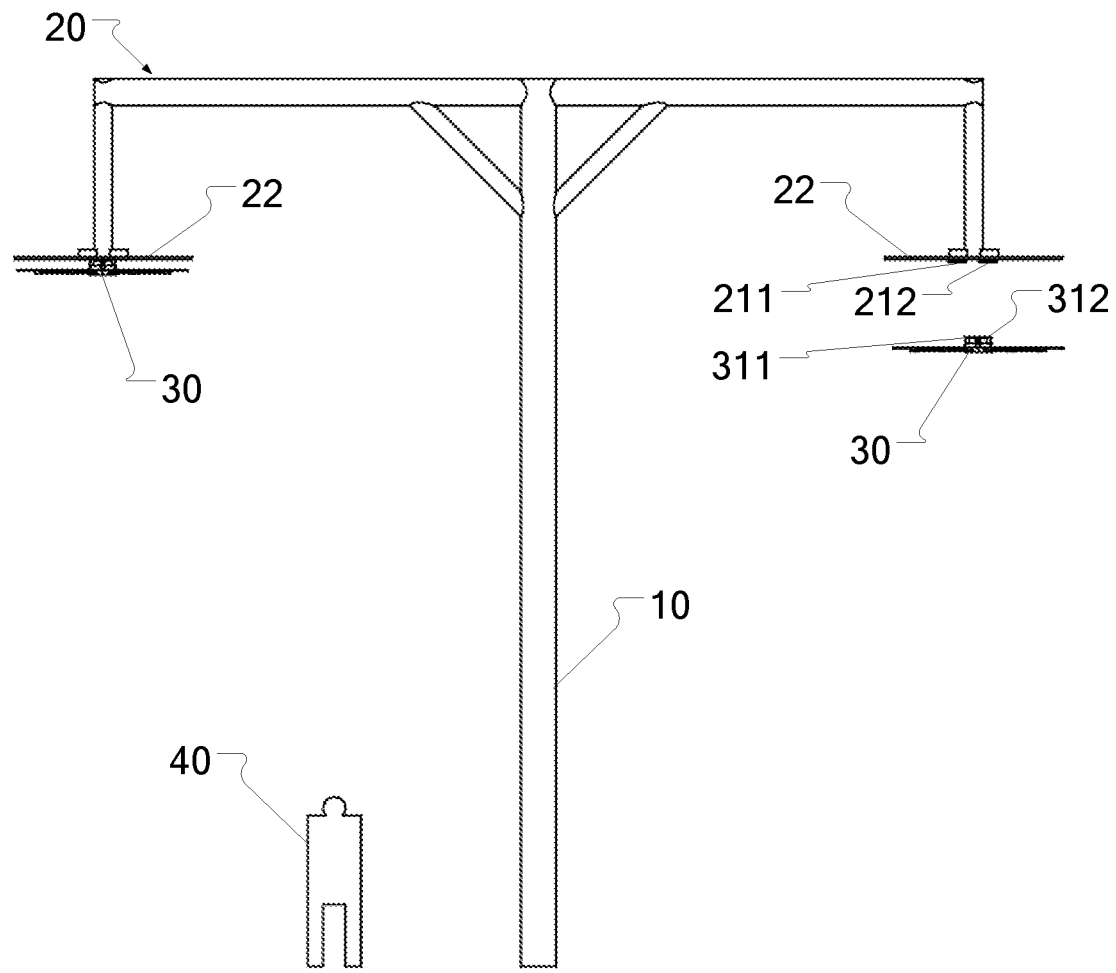
FIG. 3 is a schematic view showing a first embodiment of the present invention.

With reference to FIG. 3, when the charging system relies on magnetic force, the first locking element 21 includes two magnets respectively functioning as the first positive locking end 211 and the first negative locking end 212 while the second locking element 31 includes two metal plates respectively functioning as the second positive locking end 311 and the second negative locking end 312. After the drones 30 are docked at the stop disk 22 (after the magnets and the metal plates are mutually connected), charging the two magnets enables the two magnets to have magnetic force. When the two magnets are connected to the two metal plates, a charging circuit is established and the charging circuit charges the drones 30. When the charging to the two magnets is discontinued, the magnetic force of the magnets is back to zero, the charging to the drone 30 stops and the charging circuit is disconnected.

With reference to FIG. 4, the first positive locking end 211 and the first negative locking end 212 are respectively the metal plates on the top and on the wall of the socket, and the second positive locking end 311 and the second negative locking end 312 are respectively the metal plates on the top and on the wall of the plug. Under the circumstance that the plug is connected to the socket, the corresponding metal plate is engaged and a charging circuit is established. When the plug is separated from the socket, the corresponding metal plates are disconnected and the charging circuit is disconnected as well.

Referring to FIG. 5, in this embodiment, the second positive locking end 311 and the second negative end 312 are respectively located at the top and on the wall of the extension rod (i.e., the second locking element 31) while the first positive locking end (not shown) and the first negative locking end 212 are the first metal plates respectively located at the bottom of the stop disk 22 and the inner side of the electrical clamps (i.e., the first locking element 21). When the drone 30 is docked at the stop disk 22 of the platform 20, the second metal plate on top of the extension rod is connected to the first metal plate at the bottom of the stop disk 22. The connection between the first metal plate and the second metal plate generates a signal transmitted back to the controller responsible for controlling the movement of the electrical clamp. The controller may be a drone controller, an operation screen fixed on the object 10 or any other exterior operation apparatus. After the controller receives the feedback signal, the controller controls the electrical clamp to move and eventually clamp the extension rod, during which, the connection between the first metal plate located inside the electrical clamp and the second metal plate on the side of the extension rod fulfills the charging circuit. The separation of the electrical clamp from the extension rod breaks off the charging circuit.

In the embodiment shown in FIG. 6, the first locking element 21 includes two hooks and the second locking element 31 includes two rings, both of which are made of metal. The two hooks are respectively the first positive locking end 211 and the first negative locking end 212. The two rings are respectively the second positive locking end 311 and the second negative locking end 312. When the drone 30 is docked at the stop disk 22, the connection between the two hooks and the two rings fulfills the charging circuit. The separation of the two hooks and the two rings breaks off the charging circuit.

The embodiment shown in FIG. 7 includes two metal poles respectively functioning as the first positive locking end 211 and the first negative locking end 212 and two arms respectively functioning as the second positive locking end 311 and the second negative locking end 312. After the drone 30 is docked on the two poles, the connection between the two poles and the two arms fulfills the charging circuit and when the drone 30 takes off, the charging circuit breaks off. There are sensors on the charging circuit to determine when the drone 30 has safely landed, in order to safely switch on the charging circuit.

In a preferred embodiment of the present invention, as shown in FIGS. 1 and 2, on the object 10, there are multiple platforms 20 spaced apart from one another to form a structure similar to a bird nest, wherein at least two of the platforms 20 are respectively provided with a battery storage housing (not shown) for the drones 30. The battery storage housing is provided with a battery replacement apparatus (not shown) able to reciprocally move back and forth between the battery storage housing and the location where the drones 30 dock, such as robotic arms. The battery storage housing includes an automatic door associated with the battery replacement apparatus's movement for the battery.

Specifically, the drone 30 is equipped with m+n batteries (m, n are natural numbers ≥1) and each of the batteries is provided with a metal plate on the front side and an adjustable magnet fixed on the back side to be connected to the drone 30 such that the first locking element 21 includes m+n second adjustable magnets and the second locking element 31 includes m+n metal plates on the batteries which are on the drones 30.

Battery replacement includes:

Step (1): Docking the drone which requires battery replacement on the platform having a battery storage housing to allow m+n second magnets to correspond to m+n metal plates on the batteries; executing steps (2) to (5) to replace m batteries on the drone 30;

Step (2): Adjusting m second magnets to have magnetic force and adjusting m first magnets corresponding to the m second magnets to allow their magnetic force to be zero; moving the drone 30 away from its first platform and when the drone 30 departs, m batteries are attached to m second magnets and then old batteries are removed and the battery replacement apparatus stores the old batteries in the battery storage housing;

Step (3): Using the battery replacement apparatus on a second platform to retrieve new batteries from the battery storage housing and placing them on the m second magnets whose magnetic force is adjusted to have enough magnetic force to attach the new batteries;

Step (4): Docking the drone 30 at the second platform to allow the n second magnets to correspond to the metal plates on n batteries on the drone and have the new batteries attached to the m second magnets to correspond to m battery locations on the drone 30; adjusting the n second magnets to allow the n second magnets to attach to the drone 30;

Step (5): Adjusting the magnetic force of the m second magnets which originally have new batteries attached thereon to be zero and adjusting the first magnets on the m new batteries to allow the m new batteries to attach to the corresponding locations, adjusting magnetic force of the n second magnets to be zero and moving the drone 30 from the second platform to complete battery replacement; and Step (6): Executing steps (2) to (5) to replace the n batteries on the drone 30.

After the above explanation, it is noted that adopting varieties of the drone docking stations of the present invention helps the battery replacement, which greatly shortens the stop time for the drone. There is no need for the drone to land on the ground any more.

Preferably, the platforms 20 on the object 10 can be classified according to usage, such as battery replacement, battery charging, resting and awaiting tasks, i.e., package pick-up or drop-off to fulfill diverse requirements for the drone docking station of the embodiments of the present invention.

After the detailed description above, it is expected that anyone who is skilled in the art would be able to make alterations, modifications or improvements according to the embodiments of the present invention. Any detailed description to the embodiments should not be construed as constraints to the present invention. The scope of the embodiments of the present invention is defined in the accompanying claim set.

What is claimed is:

1. A docking station for drones, each drone having at least one second positive locking end and at least one second negative locking end, comprising:
    an elevated platform for docking the drones, the platform having a first positive locking element and a first negative locking element, the first positive locking element is disposed in parallel to the first negative locking element, the platform is adapted to receive the drones with auto-alignment while the drones are docking on the platform as well as auto-separation while the drones are leaving the platform,
    wherein
    the first positive locking element is a positive terminal of a charging circuit and the first negative locking element is a negative terminal of the charging circuit,
    when the drone is docked on the platform, the at least one second positive locking end rests on the first positive locking element and the at least one second negative locking end rests on the first negative locking element.

2. The drone docking station as claimed in claim 1, wherein the platform further includes a stop disk and the first positive locking element and the first negative locking element are adjustable magnets fixed on the stop disk;
    the second positive locking end and the second negative locking end are metal plates adapted on the drone for connection to the magnets.

3. The drone docking station as claimed in claim 1, wherein the platform further includes a stop disk and the first positive locking element and the first negative locking element together comprise a plug or a socket located and fixed on the stop disk and the second positive locking end and the second negative locking end together comprise a socket or a plug adapted on the drone to correspond to the plug or the socket on the stop disk to allow the plug or the socket on the stop disk to connect to the socket or the plug on the drone.

4. The drone docking station as claimed in claim 1, wherein the platform further includes a stop disk, the first positive locking element and the first negative locking element are metal hooks attached to the stop disk, and the second positive locking end and the second negative locking end are metal rings adapted to be attached to the drone to be connected to the metal hooks.

5. The docking station as claimed in claim 1, wherein the first positive locking element and the first negative locking element are two metallic poles horizontally spaced apart from each other, the second positive locking end and the second negative locking end are two arms on opposite sides of the drones.

6. The docking station as claimed in claim 1, wherein there are multiple platforms.

7. The docking station as claimed in claim 1, further comprising a sensor on the charging circuit for detecting docking of the drones on the platform.

8. The docking station as claimed in claim 1, wherein the charging circuit is turned on after the drones have docked on the platform.

9. A drone docking station with a charging circuit for drones, comprising:
- a vertical post;
- a platform attached to the vertical post;
- a first positive metallic pole attached to the platform, the first positive metallic pole being a positive terminal of the charging circuit; and
- a first negative metallic pole attached to the platform, the first negative metallic pole being a negative terminal of the charging circuit and disposed horizontally apart from the first positive metallic pole,
- wherein when a drone is docked between the first positive metallic pole and the first negative metallic pole, the charging circuit is closed.

10. The drone docking station of claim 9, further comprising a sensor for detecting docking of the drones.

* * * * *